US006382514B1

(12) United States Patent
Chung

(10) Patent No.: US 6,382,514 B1
(45) Date of Patent: May 7, 2002

(54) SCANNING DEVICE FOR BAR-CODE SCANNER

(76) Inventor: Kuo-Ming Chung, 4F, No. 225, Chin-Lung Rd., Nei-Hu Dist., Taipei (TW)

( * ) Notice: Subject to any disclaimer, the term of this patent is extended or adjusted under 35 U.S.C. 154(b) by 167 days.

(21) Appl. No.: 09/606,141

(22) Filed: Jun. 29, 2000

(51) Int. Cl.⁷ .................................................. G06N 7/10
(52) U.S. Cl. ............................ 235/462.38; 235/462.32
(58) Field of Search ........................... 235/462.38, 454, 235/436, 444, 449, 462.01–462.25, 462.32–462.49, 470, 472.01, 472.03, 494

(56) References Cited

U.S. PATENT DOCUMENTS

| | | | | | |
|---|---|---|---|---|---|
| 3,575,496 A | * | 4/1971 | Pollock | ...................... | 359/214 |
| 4,205,338 A | * | 5/1980 | Schaefer | ................... | 358/28.5 |
| 4,410,968 A | * | 10/1983 | Frohbach et al. | ............. | 369/44 |
| 4,965,734 A | * | 10/1990 | Edwards et al. | ....... | 364/474.09 |
| 5,059,779 A | * | 10/1991 | Krichever et al. | .......... | 235/462 |
| 5,149,949 A | * | 9/1992 | Wike, Jr. | .................... | 235/470 |
| 5,170,277 A | * | 12/1992 | Bard et al. | .................. | 235/462 |
| 5,187,612 A | * | 2/1993 | Plesko | .......................... | 310/36 |
| 5,450,202 A | * | 9/1995 | Tisue | .......................... | 356/373 |
| 5,519,198 A | * | 5/1996 | Plesko | .......................... | 235/462 |
| 5,621,561 A | * | 4/1997 | Belfatto et al. | ............. | 359/205 |
| 5,691,965 A | * | 11/1997 | Jansen et al. | .............. | 369/44.1 |
| 5,751,436 A | * | 5/1998 | Kwon et al. | ................ | 358/299 |
| 5,778,133 A | * | 7/1998 | Plesko | ......................... | 385/146 |
| 5,923,359 A | * | 7/1999 | Montgomery | ............... | 347/255 |
| 5,932,860 A | * | 8/1999 | Plesko | ......................... | 235/454 |
| 6,009,064 A | * | 12/1999 | Hajjar | ......................... | 369/112 |
| 6,134,010 A | * | 10/2000 | Zavislan | ..................... | 356/364 |

FOREIGN PATENT DOCUMENTS

JP          08274955 A   * 10/1996

* cited by examiner

Primary Examiner—Thien M. Le
(74) Attorney, Agent, or Firm—Bacon & Thomas, PLLC

(57) ABSTRACT

A scanning device for bar-code scanner comprises a pair of bushings, a rotation mechanism, and a driving mechanism, wherein the driving mechanism is to be magnetically excited to drive a Rotator of the rotation mechanism to rotate and in turn drive a reflection member on the rotation mechanism for scanning bar code on an article stepwise and reciprocally by taking advantage of an actuator member fixed to a live spindle of the Rotator.

9 Claims, 3 Drawing Sheets

SCANNING DEVICE FOR BAR-CODE SCANNER

BACKGROUND OF THE INVENTION

This invention relates generally to bar-code scanners, more particularly, it relates to a scanning device for bar-code scanner, which scans bar code by way of magnetic excitement.

In these days the matured photoelectric technology is applied widely in fields including data transmission, sensing devices, medical care, etc, particularly, the optical scanner implemented in supermarkets for reading bar code concerns people's livelihood very much. When using a bar-code scanner, the laser ray projected on a reflection mirror is reflected to project upon bar code of an article following rotation of the reflection mirror for reading the bar code synchronously.

A few patented scanning devices for bar-code scanner have disclosed a Mylar sheet mechanism that drives a reflection mirror reciprocally for scanning bar code by taking advantage of flexibility of the Mylar sheet, or a pillar magnet and an iron frame that drives the reflection mirror reciprocally by taking advantage of magnetic force.

However, the foregoing scanning devices are weak in some respects: requiring high precision in assembling; control of physical properties of material being difficult; requiring relatively longer time and more labor cost for assembling; difficult in adjusting precision of the reflection ray; and, high breakdown ratio.

SUMMARY OF THE INVENTION

The primary object of this invention is to provide a scanning device for bar-code scanner with relatively simpler structure for easy assembling, easy control and adjustment of reflection ray of a laser light source so as to eliminate defects of a conventional scanning device.

In order to realize abovesaid object, the scanning device of this invention comprises a pair of bushings, a rotation mechanism, and a driving mechanism, wherein the driving mechanism is to be magnetically excited to drive a Rotator of the rotation mechanism to rotate and in turn drive a reflection member on the rotation mechanism for scanning bar code on an article stepwise and reciprocally by taking advantage of an actuator member fixed to a spindle of the Rotator.

For more detailed information regarding this invention together with further advantages or features thereof, at least an example of preferred embodiment will be elucidated below with reference to the annexed drawings.

BRIEF DESCRIPTION OF THE DRAWINGS

The related drawings in connection with the detailed description of this invention, which is to be made later, are described briefly as follows, in which.

DETAILED DESCRIPTION OF THE PREFERRED EMBODIMENT

Figure 1:
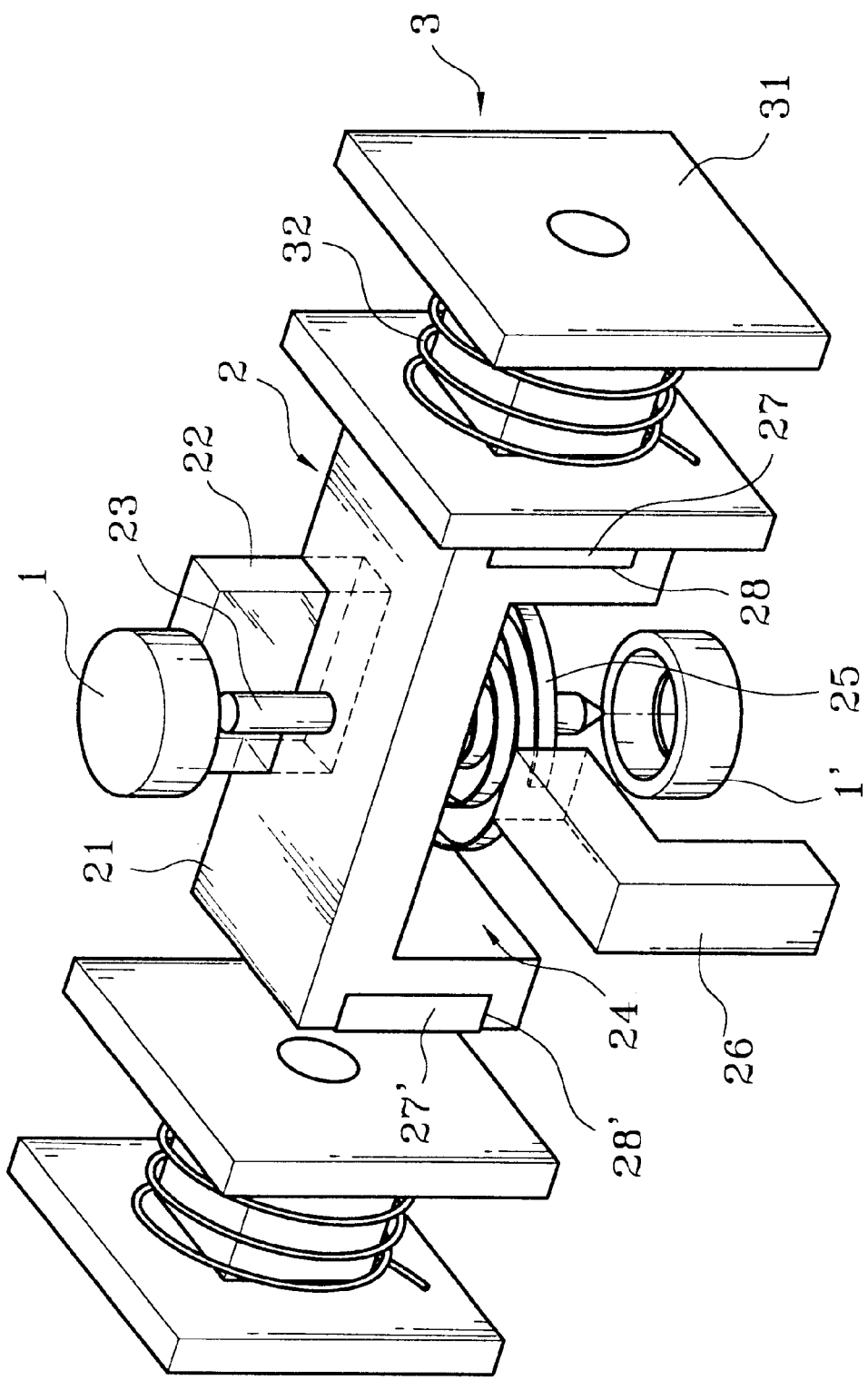
FIG. 1 is an elevational schematic view of a scanning device for bar-code scanner of this invention.

As illustrated in an elevational view shown in FIG. 1, a scanning device for bar-code scanner of this invention mainly comprises a pair of bushings 1, 1', a rotation mechanism 2, and a driving mechanism 3 all housed in a bar-code scanner for scanning bar code.

The foregoing bushings 1, 1' are made of a metallic material or a plastic material by integral projection molding together with a scanner casing (not shown) to allow the rotation mechanism 2 to rotate inside.

The rotation mechanism 2 comprises: a Rotator 21 having a reflection member 22 made in form of a mirror or a piece of aluminum foil or a glossy tiny metallic sheet, but not necessarily limited, for reflecting laser light upon an article's bar code; a live spindle 23 penetrating the Rotator 21 with two ends resided at the bushings 1, 1' respectively; an actuator member 25 made in form of a hairspring or a reed reel, but not necessarily limited, being disposed by one end at the spindle 23 in a recessed portion 24 of the Rotator 21, and the other being fixedly anchored at a fixing member 26 of the scanner casing. When the rotation mechanism 2 is driven to rotate, it drives the actuator member 25 to wind tightly, and on the contrary, when:the driving force is removed, the tightly wound actuator 25 will release resilient force to restore the rotation member 21 back to original loose state. In addition, two symmetrical recessed portions 27, 27' are formed in two lateral faces of the Rotator 21 respectively for accommodating two magnets 28, 28', which are to be driven by the driving mechanism 3.

The driving mechanism 3 is composed of a spool 31 and a coil 32 wound on the spool 31, and is deposed on two lateral portions of the rotation mechanism 2 respectively. When electric power is applied to the driving mechanism 3, an induced magnetic force will repulse the magnets 28, 28' on the Rotator 21.

Figure 2:
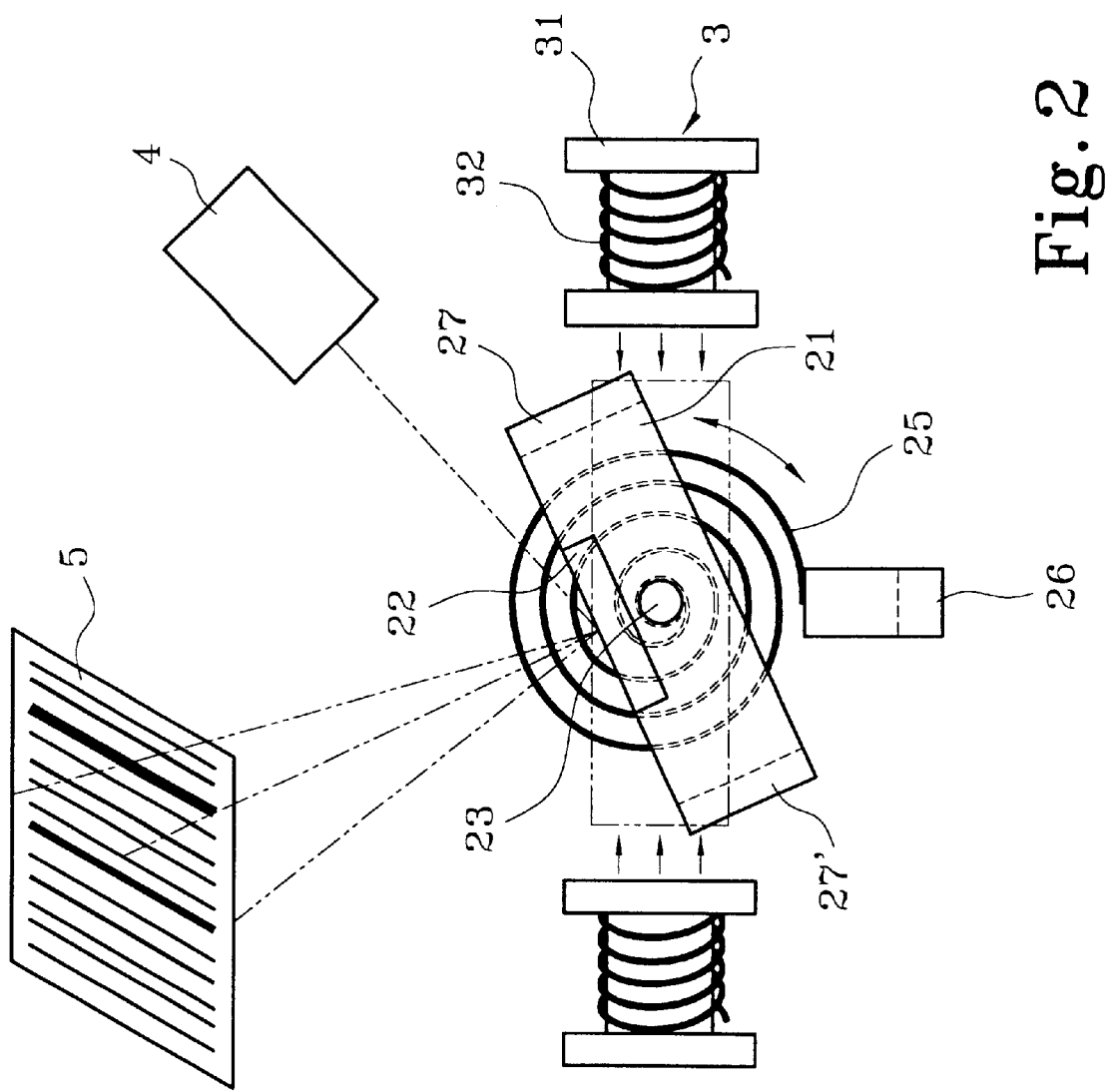
FIG. 2 is a schematic view showing that the scanning device in FIG. 1 is under rotation.
Figure 3:
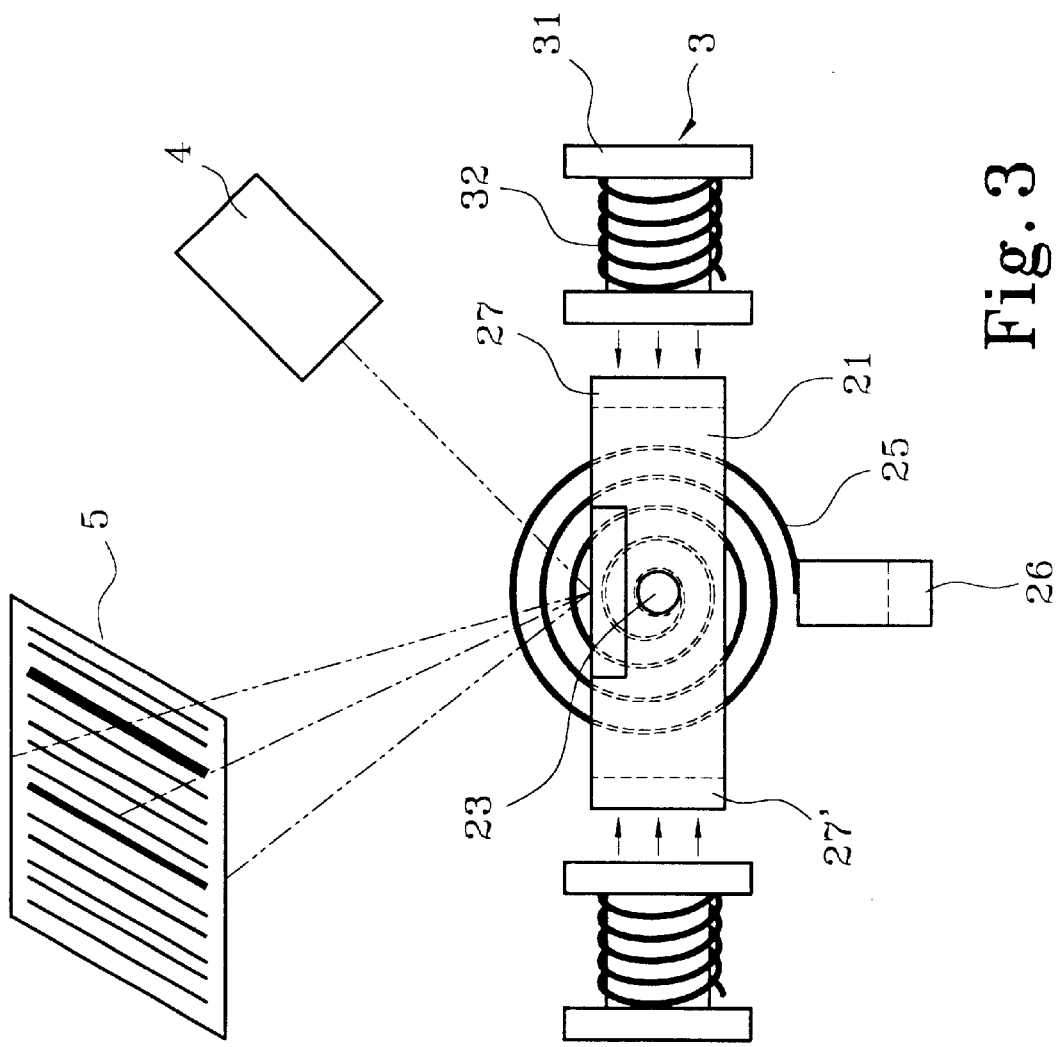
FIG. 3 is another schematic view showing action mode of FIG. 1.

As shown in FIGS. 2, 3, when the magnets 28, 28' are repulsed to drive the Rotator 21 to rotate, the spindle 23 will rotate accordingly to have the actuator member 25 wound tightly, and meanwhile, light projected on the reflection member 22 emitted from a laser light source 4 is reflected stepwise on an article's bar code 5 for reading.

When the electric power is shut down, no current would pass through the driving mechanism 3, and the magnets 28, 28' are no longer repulsed so that the actuator member 25 will move reversely and release resilient force to enable the Rotator 21 to rotate backwards according to the law of inertia and keep in operation until the momentum of inertia disappears. Hence, a reciprocal motion of the Rotator 21 can continue to drive the reflection member 22 for scanning purpose as long as the coil 32 on the driving mechanism 3 is magnetically excited intermittently from time to time.

Although, this invention has been described in terms of preferred embodiments, it is apparent that numerous variations and modifications may be made without departing from the true spirit and scope thereof, as set forth in the following claims.

What is claimed is:

1. A scanning device for bar-code scanner, the scanning device being disposed in a bar-code scanner for scanning bar code on an article, comprising:

a rotation mechanism, housed in the bar-code scanner, having a Rotator provided with a reflection member and a live spindle, wherein the live spindle penetrates the Rotator; an actuator member is attached to the live spindle in a recessed portion of the Rotator; and a recessed portion is formed in two lateral faces of the Rotator respectively for accommodating a magnet; and a driving mechanism disposed on those two lateral faces of the Rotator respectively for driving the Rotator to rotate by induced magnetic force;

and by the arrangement, the reflection member on the Rotator can reflect light of a laser light source in the bar-code scanner upon bar code of an article for bar-code scanning when the Rotator is repulsed to rotate by magnetic force of the driving mechanism.

2. The scanning device according to claim 1, wherein a pair of bushings is disposed in the bar-code scanner to facilitate smooth rotation of the Rotator.

3. The scanning device according to claim 2, wherein the bushings are made of a metallic material.

4. The scanning device according to claim 2, wherein the bushings are made of a plastic material or integrally projection molded together with a bar-code scanner casing.

5. The scanning device according to claim 1, wherein the reflection member is, but not necessarily is, a mirror, a piece of aluminum foil, or a glossy metallic sheet.

6. The scanning device according to claim 1, wherein the actuator member is, but not necessarily is, a hairspring or a reed reel.

7. The scanning device according to claim 1, wherein one end of the actuator member is fixedly disposed at the spindle and the other attached to a fixing member.

8. The scanning device according to claim 7, wherein the fixing member is disposed in the bar-code scanner.

9. The scanning device according to claim 1, wherein the driving mechanism comprises a spool and a coil wound on the spool.

* * * * *